(12) United States Patent
Taniyama et al.

(10) Patent No.: US 11,348,341 B2
(45) Date of Patent: May 31, 2022

(54) RECORDING CONTROL DEVICE, RECORDING CONTROL METHOD, AND PROGRAM

(71) Applicant: JVCKENWOOD Corporation, Yokohama (JP)

(72) Inventors: Hirofumi Taniyama, Yokohama (JP); Yasutoshi Sakai, Yokohama (JP); Keita Hayashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/339,104

(22) Filed: Jun. 4, 2021

(65) Prior Publication Data
US 2021/0295064 A1     Sep. 23, 2021

Related U.S. Application Data

(63) Continuation of application No. PCT/JP2019/042889, filed on Oct. 31, 2019.

(30) Foreign Application Priority Data

Mar. 27, 2019  (JP) .............................. JP2019-060184
Sep. 20, 2019  (JP) .............................. JP2019-171779

(51) Int. Cl.
*H04N 7/18* (2006.01)
*H04N 5/77* (2006.01)
(Continued)

(52) U.S. Cl.
CPC .............. *G06V 20/58* (2022.01); *G06V 20/40* (2022.01); *G06V 20/597* (2022.01);
(Continued)

(58) Field of Classification Search
CPC ........ G11B 20/10; G06V 20/56; G06V 20/40; G06V 20/44; H04N 7/18; H04N 5/91; H04N 5/77; G06F 16/743; G07C 5/00
(Continued)

(56) References Cited

U.S. PATENT DOCUMENTS

2010/0201819 A1   8/2010  Minowa
2019/0230325 A1   7/2019  Yamada et al.
2020/0396413 A1* 12/2020  Tsubouchi ........... G06V 40/161

FOREIGN PATENT DOCUMENTS

CN       101772786 A       7/2010
CN       106469506 A  *    3/2017
(Continued)

*Primary Examiner* — Robert Chevalier
(74) *Attorney, Agent, or Firm* — Procopio, Cory, Hargreaves & Savitch LLP

(57) ABSTRACT

According to the present invention, there is provided a recording apparatus including: a capture-data acquisition unit configured to acquire capture-data items obtained by a camera configured to capture surroundings of a vehicle; an event detection unit configured to detect an event for the vehicle; a user-change determination unit configured to determine whether or not a change of users of the vehicle has occurred; and a recording control unit configured to record the capture-data items acquired by the capture-data acquisition unit into a recording unit, configured to store one of the capture-data items as an event-record data item into the recording unit when the event detection unit has detected the event, the one corresponding to the event, and configured to delete the capture-data items recorded in the recording unit when the user-change determination unit determines that the change of the users of the vehicle has occurred.

9 Claims, 7 Drawing Sheets

(51) Int. Cl.
    *G06V 20/58*    (2022.01)
    *G06V 20/40*    (2022.01)
    *G06V 20/59*    (2022.01)
    *G06V 40/16*    (2022.01)

(52) U.S. Cl.
    CPC ............. *G06V 40/176* (2022.01); *H04N 5/77* (2013.01); *G06V 20/44* (2022.01)

(58) Field of Classification Search
    USPC ........ 348/148, 143, 149, 151, 153; 386/210, 386/224, 223, 226
    See application file for complete search history.

(56) References Cited

FOREIGN PATENT DOCUMENTS

| | | | |
|---|---|---|---|
| CN | 107065694 A | | 8/2017 |
| JP | 2004086341 A | * | 3/2004 |
| JP | 103295279 A | * | 9/2013 |
| JP | 2019028763 A | | 2/2019 |

* cited by examiner

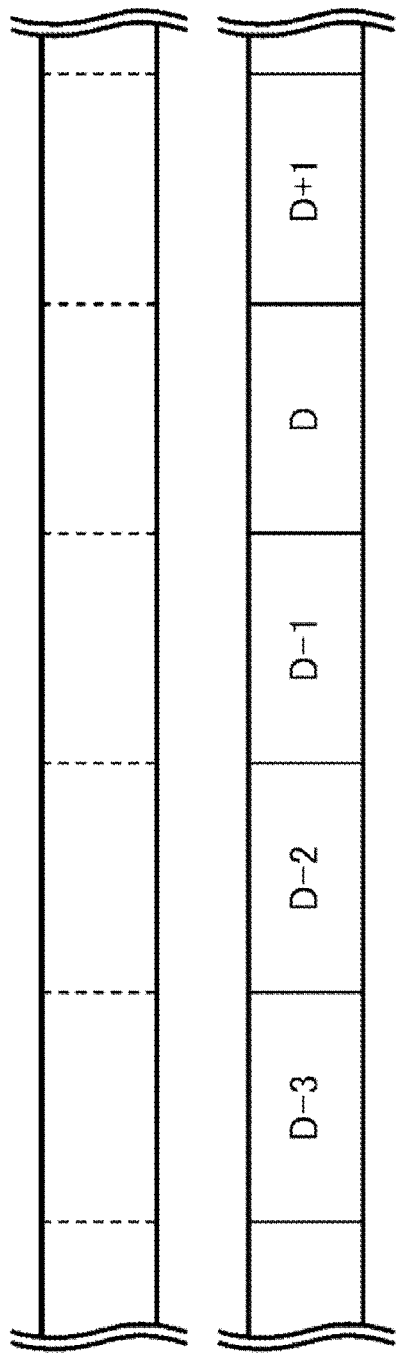
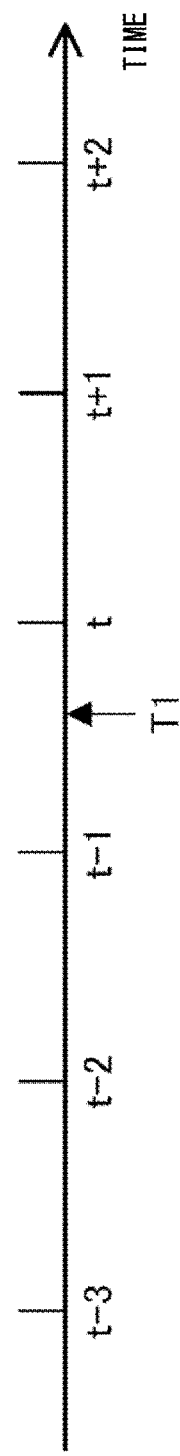
Fig. 2A
Fig. 2B
Fig. 2C

RECORDING CONTROL DEVICE, RECORDING CONTROL METHOD, AND PROGRAM

CROSS REFERENCE TO RELATED APPLICATION

This application is a Bypass Continuation of PCT/JP2019/042889 filed on Oct. 31, 2019, which is based upon and claims the benefit of priority from Japanese patent application No. 2019-060184 filed on Mar. 27, 2019 and 2019-171779 filed on Sep. 20, 2019, the disclosure of which is incorporated herein in its entirety by reference.

BACKGROUND

The present invention relates to a recording control apparatus, a recording control method, and a program. More specifically, the present invention relates to a recording control apparatus, a recording control method, and a program that detect accidents of a moving body such as an automobile, and properly control recorded data.

Dashboard cameras that detect impact on a vehicle and store capture data including video data of predetermined periods before and after a time point of the detection have prevailed. For example, Patent Literature 1 (Japanese Unexamined Patent Application Publication No. 2019-028763) discloses a dashboard camera that constantly records capture-data items to a memory card, and stores, of the capture-data items, a capture-data item of periods before and after a time point of occurrence of an event as an event-record data item in a case where the event has been detected.

If the dashboard camera as disclosed in Patent Literature 1 is used, for example, in a vehicle to be used by unspecified users, such as a car-sharing vehicle, recorded capture data of a driving status of a previous another user may be reproduced.

The present invention has been made in view of the problem as described above, and an object of the present invention is to provide a recording control apparatus, a recording control method, and a program with enhanced security.

SUMMARY

According to the present invention, there is provided a recording control apparatus including:

a capture-data acquisition unit configured to acquire capture-data items obtained by a camera configured to capture surroundings of a vehicle;

an event detection unit configured to detect an event for the vehicle;

a user-change determination unit configured to determine whether or not a change of users of the vehicle has occurred; and a recording control unit configured to record the capture-data items acquired by the capture-data acquisition unit into a recording unit, configured to store one of the capture-data items as an event-record data item into the recording unit when the event detection unit has detected the event, the one of the capture-data items corresponding to the event, and configured to delete the capture-data items recorded in the recording unit when the user-change determination unit determines that the change of the users of the vehicle has occurred.

According to the present invention, there is provided a recording control method including:

a capture-data acquisition step of acquiring capture-data items obtained by a camera configured to capture surroundings of a vehicle;

an event detection step of detecting an event for the vehicle;

a user-change determination step of determining whether or not a change of users of the vehicle has occurred; and a recording control step including recording the capture-data items acquired in the capture-data acquisition step into a recording unit, storing one of the capture-data items as an event-record data item into the recording unit when the event is detected in the event detection step, the one of the capture-data items corresponding to the event, and deleting the capture-data items recorded in the recording unit when a determination that the change of the users of the vehicle has occurred is made in the user-change determination step.

According to the present invention, there is provided a non-transitory computer readable medium storing a program for a computer configured to operate as a recording control apparatus to perform:

a capture-data acquisition step of acquiring capture-data items obtained by a camera configured to capture surroundings of a vehicle;

an event detection step of detecting an event for the vehicle;

a user-change determination step of determining whether or not a change of users of the vehicle has occurred; and a recording control step including recording the capture-data items acquired in the capture-data acquisition step into a recording unit, storing one of the capture-data items as an event-record data item into the recording unit when the event is detected in the event detection step, the one of the capture-data items corresponding to the event, and deleting the capture-data items recorded in the recording unit when a determination that the change of the users of the vehicle has occurred is made in the user-change determination step.

According to the present invention, security of video data that is captured from a vehicle or the like can be enhanced.

BRIEF DESCRIPTION OF THE DRAWINGS

FIGS. 2A-2C are a chart conceptually showing a relationship between capture data and event record data according to the first embodiment of the present invention;

DETAILED DESCRIPTION

Embodiments according to the present invention are described hereinafter with reference to the drawings. Note that, although examples of recording apparatuses according to the embodiments are described by way of an example of a dashboard camera to be used in an automobile, i.e., a moving body in the following description, the present invention is not limited thereto. For example, the present invention is applicable also to various vehicles such as a motor-cycle and a bicycle, and various-other moving bodies such as a train, a ship, a robot, and even humans. In addition, the present invention is not limited to the following embodiments.

Figure 1:
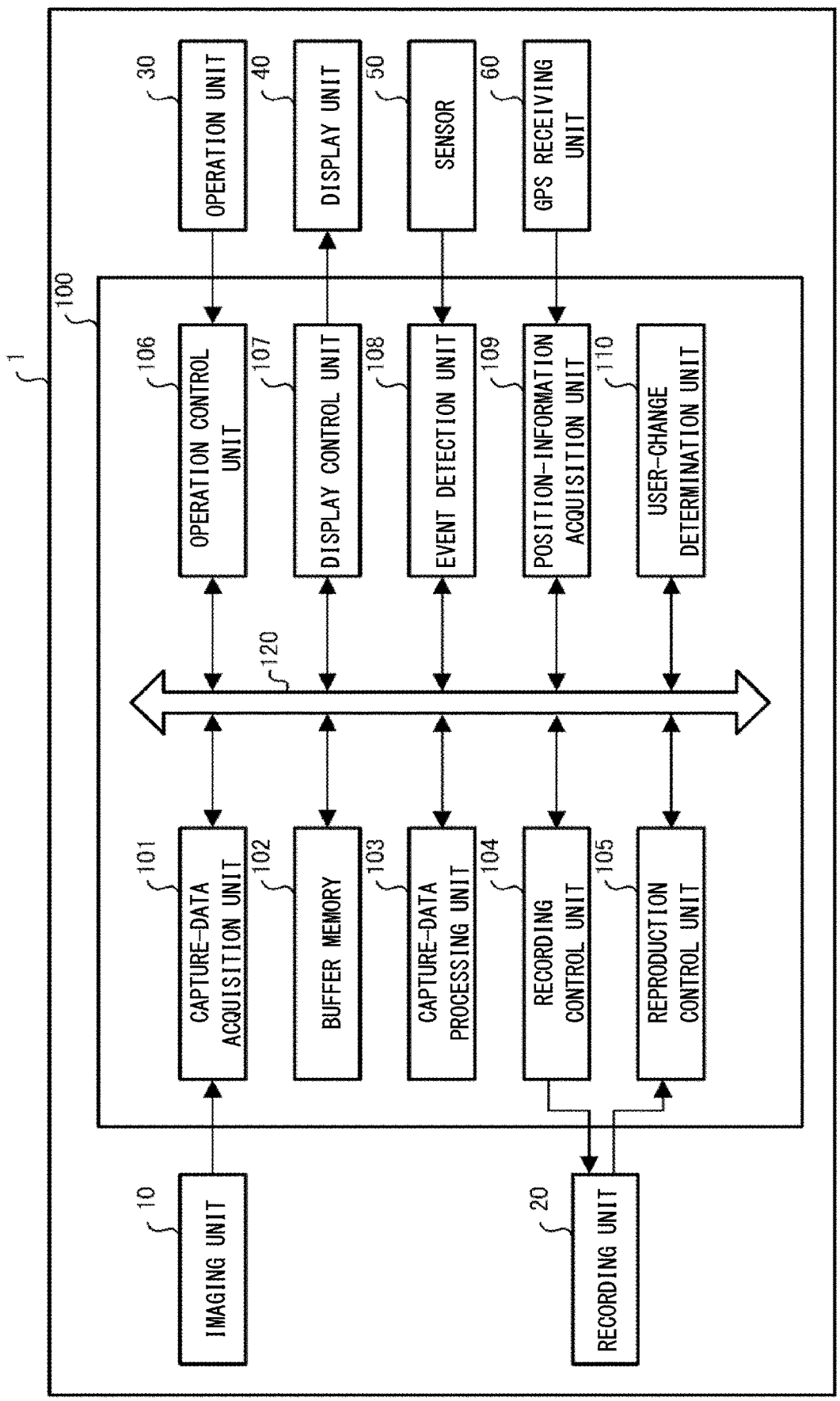
FIG. 1 is a block diagram showing a configuration of a recording apparatus according to a first embodiment of the present invention.

A first embodiment of the present invention is described hereinafter with reference to FIG. 1 to FIG. 3. FIG. 1 is a block diagram showing a configuration of a recording apparatus 1 according to the first embodiment of the present invention. The recording apparatus 1 is installed as a dashboard camera to an upper portion of a windshield of a vehicle in an orientation of a front side as viewed from the vehicle, detects impact as that in case of an accident or the like, and stores capture data of a period including a timing of the occurrence of the accident as event record data. The recording apparatus 1 as the dashboard camera is not limited to one that is installed as a stand-alone apparatus in the vehicle, and is applicable, for example, to a configuration in which a navigation apparatus functions also as the dashboard camera, or to a configuration in which the dashboard camera is installed in advance in the vehicle. Alternatively, the recording apparatus 1 may be an integrated apparatus including all components shown in FIG. 1, or a plurality of apparatuses may cooperatively serve as the recording apparatus 1.

In FIG. 1, the recording apparatus 1 includes a control unit 100 as a recording control apparatus, an imaging unit 10, a recording unit 20, an operation unit 30, a display unit 40, a sensor 50, and a GPS (Global Positioning System) receiving unit 60. Thus, the recording control apparatus according to the present invention may be regarded as the recording apparatus according to the present invention.

The control unit 100 includes one or a plurality of CPUs (Central Processing Units) and GPUs (Graphics Processing Units) that execute various data processes, and a buffer memory 102. The control unit 100 executes the various processes in accordance with a program. The control unit 100 includes at least, as its components and functions, a bus line 120, a capture-data acquisition unit 101, a capture-data processing unit 103, a recording control unit 104, a reproduction control unit 105, an operation control unit 106, a display control unit 107, an event detection unit 108, a position-information acquisition unit 109, and a user-change determination unit 110. In the following description, it is assumed that all the components of the control unit 100 exchange the capture data, control signals, and the like via the bus line 120.

The control unit 100 is the recording control apparatus that performs operations according to the present invention in the recording apparatus 1, and implements a recording method according to the present invention. In addition, the control unit 100 is a computer that executes the program according to the present invention.

The imaging unit 10 is a camera that captures surroundings of the vehicle, i.e., the moving body. The imaging unit 10 may be provided integrally with the recording apparatus 1 as a component of the recording apparatus 1, or may be a separate unit that is connected to the recording apparatus 1 in a wired or a wireless manner. In addition, a separate unit including the imaging unit 10 and the capture-data acquisition unit 101 may be connected to the recording apparatus 1 in a wired or a wireless manner.

Although not shown, the imaging unit 10 includes a lens, an image sensor, and A-D (Analog to Digital) conversion devices. The imaging unit 10 outputs obtained capture data to the capture-data acquisition unit 101. The capture data herein refers to data of a video that is captured by the imaging unit 10, which may include audio data in addition to the video data.

Although the imaging unit 10 shown in FIG. 1 is one, the imaging unit 10 may include a plurality of cameras. For example, the plurality of cameras may be an arbitrary set of cameras that respectively capture, for example, the front side, a rear side, and sides as viewed from the vehicle, and an inside of a cabin.

The imaging unit 10 captures ranges around the vehicle. For example, the camera oriented to the front side as viewed from the vehicle mainly captures a range of approximately 180 degrees in a horizontal direction on the front side as viewed from the vehicle. Alternatively, the camera that captures the front side as viewed from the vehicle and the camera that captures the rear side as viewed from the vehicle in a pair mainly capture the range of approximately 180 degrees in the horizontal direction on the front side as viewed from the vehicle and a range of approximately 180 degrees in the horizontal direction on the rear side as viewed from the vehicle, respectively. In another alternative, the plurality of cameras that capture front-and-rear and right-and-left directions of the vehicle capture the surroundings of the vehicle.

The recording unit 20 is a non-volatile memory for recording the capture data obtained by the imaging unit 10 under control by the recording control unit 104. Examples of the recording unit 20 include a memory card. The capture data recorded in the recording unit 20 is reproduced under control by the reproduction control unit 105. The recording unit 20 may be replaced with a separate recording-and-reproducing apparatus including not only the recording unit 20 but also the recording control unit 104 and the reproduction control unit 105. The recording unit 20 need not necessarily be the memory card that is insertable to and removable from the recording apparatus 1, and may be a memory that is unremovable from the recording apparatus 1, or may be a separate apparatus that is connected to the recording apparatus 1 in a wired or a wireless manner.

The operation unit 30 is an interface that accepts operations to the recording apparatus 1, and that outputs information about the accepted operations to the operation control unit 106. The operation unit 30 includes various switches or a touchscreen that accepts the operations by a user. The operation unit 30 may accept operations from other wirelessly-connected apparatuses. The operation unit 30 accepts, for example, an operation to start recording of an event by the user. In addition, the operation unit 30 accepts an operation to reproduce event record data by the user.

The display unit 40 is a display apparatus that displays information of various types under control by the display control unit 107. The display unit 40 includes a display panel such as a liquid crystal panel and an OLED (organic light-emitting diode) panel. The display unit 40 may be provided integrally with the recording apparatus 1, or may be a separate unit that is connected thereto in a wired or a wireless manner. The display unit 40 may be another wirelessly-connected apparatus including the display control unit 107.

The sensor 50 is, for example, an acceleration sensor that detects accelerations applied to the recording apparatus 1 or the vehicle. The sensor 50 is, for example, a three-axis acceleration sensor that detects the accelerations applied in an x-axis direction as the front-and-rear direction of the vehicle, a y-axis direction as the right-and-left direction of the vehicle, and a z-axis direction as an upper-and-lower direction of the vehicle. The sensor 50 outputs information about the detected accelerations to the event detection unit 108. The sensor 50 may be provided integrally with the recording apparatus 1, or may be a separate sensor that is connected to the recording apparatus 1 in a wired or a wireless manner. Alternatively, the sensor 50 may be a separate unit including the sensor 50 and the event detection unit 108.

The GPS receiving unit 60 is a GPS antenna that receives signals from GPS satellites or the like. The GPS receiving unit 60 outputs the received signals to the position-information acquisition unit 109. The GPS receiving unit 60 is not limited to a receiving unit that is compliant with GPS, and may be, for example, a receiving apparatus that is compliant with positioning satellite systems of other types. The GPS receiving unit 60 may be provided integrally with the recording apparatus 1, or may be a separate unit that is connected thereto in a wired or a wireless manner. In addition, the GPS receiving unit 60 may be another separate apparatus including the GPS receiving unit 60 and the position-information acquisition unit 109.

The capture-data acquisition unit 101 acquires the capture data obtained by the imaging unit 10. The capture-data acquisition unit 101 outputs the capture data acquired from the imaging unit 10 to the buffer memory 102.

The buffer memory 102 is an internal memory of the control unit 100, which temporarily stores the capture data acquired by the capture-data acquisition unit 101. Specifically, the buffer memory 102 temporarily stores, while updating, the capture data acquired by the capture-data acquisition unit 101, which corresponds to certain periods.

The capture-data processing unit 103 converts the capture data temporarily stored in the buffer memory 102 to an arbitrary file format such as MP4 by encoding with an arbitrary codec scheme such as H.264 or MPEG-4 (Moving Picture Experts Group). The capture-data processing unit 103 generates a capture-data file corresponding to one of the certain periods from the capture data that is temporarily stored in the buffer memory 102. Specifically, the capture-data processing unit 103 generates capture-data files each corresponding to 60 seconds in a recording order from the capture data that is temporarily stored in the buffer memory 102. The capture-data processing unit 103 outputs the generated capture-data files to the recording control unit 104. In addition, the capture-data processing unit 103 outputs the generated capture-data files to the display control unit 107. The period of each of the generated capture-data files, which is set to 60 seconds as an example, is not limited thereto.

The recording control unit 104 causes the recording unit 20 to record the capture-data files that are generated by the capture-data processing unit 103. The recording control unit 104 causes the recording unit 20 to record the capture-data files that are generated by the capture-data processing unit 103 as overwritable capture-data files during a period in which the event detection unit 108 does not detect an event. If a recording capacity of the recording unit 20 reaches its upper limit, the recording control unit 104 cause the recording unit 20 to overwrites one of the overwritable capture-data files, specifically, one of old capture-data files recorded in a recording area in the recording unit 20 with a new capture-data file. By doing so, the new capture-data file is recorded.

If the event detection unit 108 determines that an event has occurred, that is, if an event is detected, the recording control unit 104 causes the recording unit 20 to store a capture-data file of a predetermined period including a time point when the event occurs as a write-protected event-record data file. The recording control unit 104 may cause the recording unit 20 to store one of the capture-data files that are generated by the capture-data processing unit 103 as the write-protected event-record data file. The recording control unit 104 may cause the recording unit 20 to store not only the event-record data file but also information about a current position at the time when the event is detected.

The recording control unit 104 may store the event-record data file by an arbitrary method. For example, the recording control unit 104 may add a write-protection flag, for example, to a header or a payload of a write-protected section of the capture-data file to be stored into the recording unit 20. Alternatively, the recording control unit 104 may store the write-protected section of the capture-data file into a write-protected area in the recording unit 20. In another alternative, the recording control unit 104 may transmit and store the write-protected section of the capture-data file into another apparatus.

The recording control unit 104 performs control to delete ones of the capture-data files recorded in the recording unit 20. If the user-change determination unit 110 determines that a change of users of the vehicle has occurred, the recording control unit 104 deletes the ones of the capture-data files recorded in the recording unit 20. The ones of the capture-data files to be deleted by the recording control unit 104 if the user-change determination unit 110 determines that the change of the users of the vehicle has occurred are the capture-data files that are recorded in the overwritable state in the recording unit 20. The recording control unit 104 may perform the control to delete the ones of the capture-data files if the event is not detected in a period before the occurrence of the change of the users.

The reproduction control unit 105 performs control to reproduce the capture-data files recorded in the recording unit 20. The reproduction control unit 105 not only reproduces the overwritable ones of the capture-data files recorded in the recording unit 20, but also reproduces and outputs the write-protected event-record data file to the display control unit 107.

The operation control unit 106 acquires information about the operations that are accepted by the operation unit 30, and outputs operation instructions based on the operation information respectively to the components. When the operation control unit 106 acquires instructions to select data of various types to be reproduced from the operation unit 30, the operation control unit 106 causes the reproduction control unit 105 to select, for example, the files recorded in the recording unit 20. When the operation control unit 106 acquires an instruction for reproduction of the data of the various types from the operation unit 30, the operation control unit 106 causes the reproduction control unit 105 to execute processes for the reproduction. Examples of the instruction for the reproduction of the data of the various types include reproduction start, pause, reproduction stop, and displaying on an enlarged scale.

The display control unit 107 causes the display unit 40 to display the information of the various types. For example, the display control unit 107 causes the display unit 40 to display the capture data being obtained by the imaging unit 10. Further, the display control unit 107 causes the display unit 40 to display the capture-data files such as the event-record data file that has been stored in the recording unit 20 and that is reproduced by the reproduction control unit 105. Still further, if the display unit 40 has a function of the touchscreen as the operation unit 30, the display control unit 107 causes the display unit 40 to display, for example, icons that accept touch operations.

The event detection unit 108 acquires information about the accelerations detected by the sensor 50, i.e., the acceleration sensor. If the event detection unit 108 detects an acceleration corresponding to an event, the event detection unit 108 determines that the event has been detected. If the event detection unit 108 determines that the event has been detected, the event detection unit 108 outputs information that the event has been detected to the recording control unit 104.

Examples of the acceleration that is detected by the event detection unit 108 and that corresponds to the event include one of the accelerations detected by the sensor 50, the one corresponding to an acceleration in case where the vehicle and another object such as another vehicle collide against each other. In the detection of the acceleration corresponding to the event, weighting may be performed in each of the x-axis direction, the y-axis direction, and the z-axis direction. In addition, an acceleration that has sharply increased may be detected as the acceleration corresponding to the event.

The position-information acquisition unit 109 specifies a current position at each time in response, for example, to the signals that are received from the GPS satellites by the GPS receiving unit 60, and outputs information about the current position at each of the times to the recording control unit 104 and the user-change determination unit 110. The position-information acquisition unit 109 specifies latitude and longitude as the information about the current positions. In specifying the current positions, the position-information acquisition unit 109 may use not only the signals via the GPS receiving unit 60 but also, for example, information about positions of access points by detecting Wi-Fi (trademark) radio waves or the like. In addition, the position-information acquisition unit 109 need not necessarily be compliant with the GPS, and may be compliant with the positioning satellite systems of other types.

The user-change determination unit 110 determines whether or not the change of the users of the vehicle has occurred. The determination by the user-change determination unit 110 as to whether or not the change of the users has occurred is made on a premise that the vehicle is assigned to a specific place and that an unspecified user starts to use the vehicle from this specific place. When the vehicle is returned to the specific place, the user-change determination unit 110 determines that the change of the users of the vehicle has occurred. The vehicle in this case is, for example, a car-sharing vehicle or a company vehicle that is assigned to a specific office. In addition, the specific place in this case is, for example, a parking lot or an office where the car-sharing vehicle to be rented out is assigned. The user-change determination unit 110 is able to refer to position information of the place where the vehicle is assigned. The position information of the place where the vehicle is assigned is recorded, for example, in the internal memory of the recording apparatus 1.

Specifically, although a change of users of the company vehicle or the like may not occur each time a user returns to the specific place such as the office where the vehicle is assigned, also in such a case, the change of the users may be regarded as having occurred.

Next, with reference to FIG. 2, a relationship between first capture data and the event record data is described. FIG. 2 is a chart conceptually showing the relationship between the capture data and the event record data. The abscissa axis in FIG. 2 represents a lapse of time, specifically, its rightward direction represents the lapse of time.

FIG. 2A shows the capture data that the capture-data acquisition unit 101 has acquired from the imaging unit 10 and has temporarily stored in the buffer memory 102. Dotted lines in FIG. 2A correspond to a time t−3 to a time t+2 that are represented along the time line, and show periods in which the capture-data processing unit 103 generates the files. Under a state in which the capture data is temporarily stored in the buffer memory 102, the files have not been generated, and hence are represented by the dotted lines.

FIG. 2B shows the capture-data files that are generated by the capture-data processing unit 103 from the capture data that is temporarily stored in the buffer memory 102 by the capture-data processing unit 103, and that are recorded into the recording unit 20 by the recording control unit 104. For example, a capture-data file D-3 is converted from a capture-data item that is obtained between the time t−3 and a time t−2, which is recorded in the overwritable state in the recording unit 20. In addition, a capture-data file D-2 is similarly converted from a capture-data item that is obtained between the time t−2 and a time t−1, which is recorded in the overwritable state in the recording unit 20.

For example, if the recording capacity of the recording unit 20 reaches its upper limit, of the capture-data files shown in FIG. 2B, a capture-data file preceding the capture-data file D-3 is overwritten, then the capture-data file D-3 is overwritten, and then the capture-data file D-2 is overwritten.

For example, if an event is detected at a time T1 between the time t−1 to a time "t," a capture-data file of a period from a given time before the time T1, i.e., an event-occurrence time to another given time after the time T1 is stored as the event-record data file. The given times, which are, for example, 30 seconds before the time T1, i.e., the event-occurrence time and 30 seconds after the time T1, are not limited thereto.

Specifically, if the event is detected at the time T1 between the time t−1 and the time "t," the recording control unit 104 stores a capture-data file D-1 as an event-record data file D-1' into the write-protected area in the recording unit 20.

For example, if the recording capacity of the recording unit 20 reaches its upper limit, although the capture-data file D-1 is overwritten subsequent to the capture-data file D-2 of the capture-data files shown in FIG. 2B, as shown in FIG. 2C, the capture-data file D-1 has been stored as the capture-data file D-1' in the write-protected area in the recording unit 20. Thus, the capture-data file D-1 is reliably stored.

The capture-data file D-1', which is converted from the capture-data item of the period from the time t−1 to the time "t" and which is stored in the write-protected area in the recording unit 20, is an event-record data file including the time T1, i.e., the event-occurrence time point. The event-record data file is not limited to a capture-data file that is generated as the file of the period including the event-occurrence time point. With regard to the event-record data file, for example, the capture-data file of the period of from the given time before the time T1, i.e., the event-occurrence time to the other given time after the time T1 may be stored as the event-record data file. Neither of the given times is not limited to the exemplified 30 seconds.

In addition, the event-record data file need not necessarily be stored in the write-protected area in the recording unit 20. For example, the event-record data file may be recorded to a recording unit of a pre-registered another apparatus with use of a communication function (not shown). Specifically, the event-record data file may be transmitted to a driver's smartphone of a passenger's smartphone that is paired in advance with the recording apparatus 1 and that has established communication therewith. Alternatively, the event-record data file may be transmitted to the driver or persons concerned with the driver, who are pre-registered with the recording apparatus 1, or to apparatuses such as a server of, for example, an insurance provider or a security provider.

It is preferred that both the capture-data file and the event-record data file be recorded in association with the position information acquired by the position-information acquisition unit 109.

A recording procedure to be executed by the recording apparatus 1 is described hereinafter with reference to FIG. 3. The recording procedure to be executed by the recording apparatus 1 is executed in accordance with the program by the control unit 100 as the computer that operates as the recording apparatus 1. The function of the control unit 100 may be implemented in a distributed manner by a plurality of apparatuses or control apparatuses of a plurality of units. In that case, the program is executed cooperatively by the apparatuses or the units.

Figure 3:
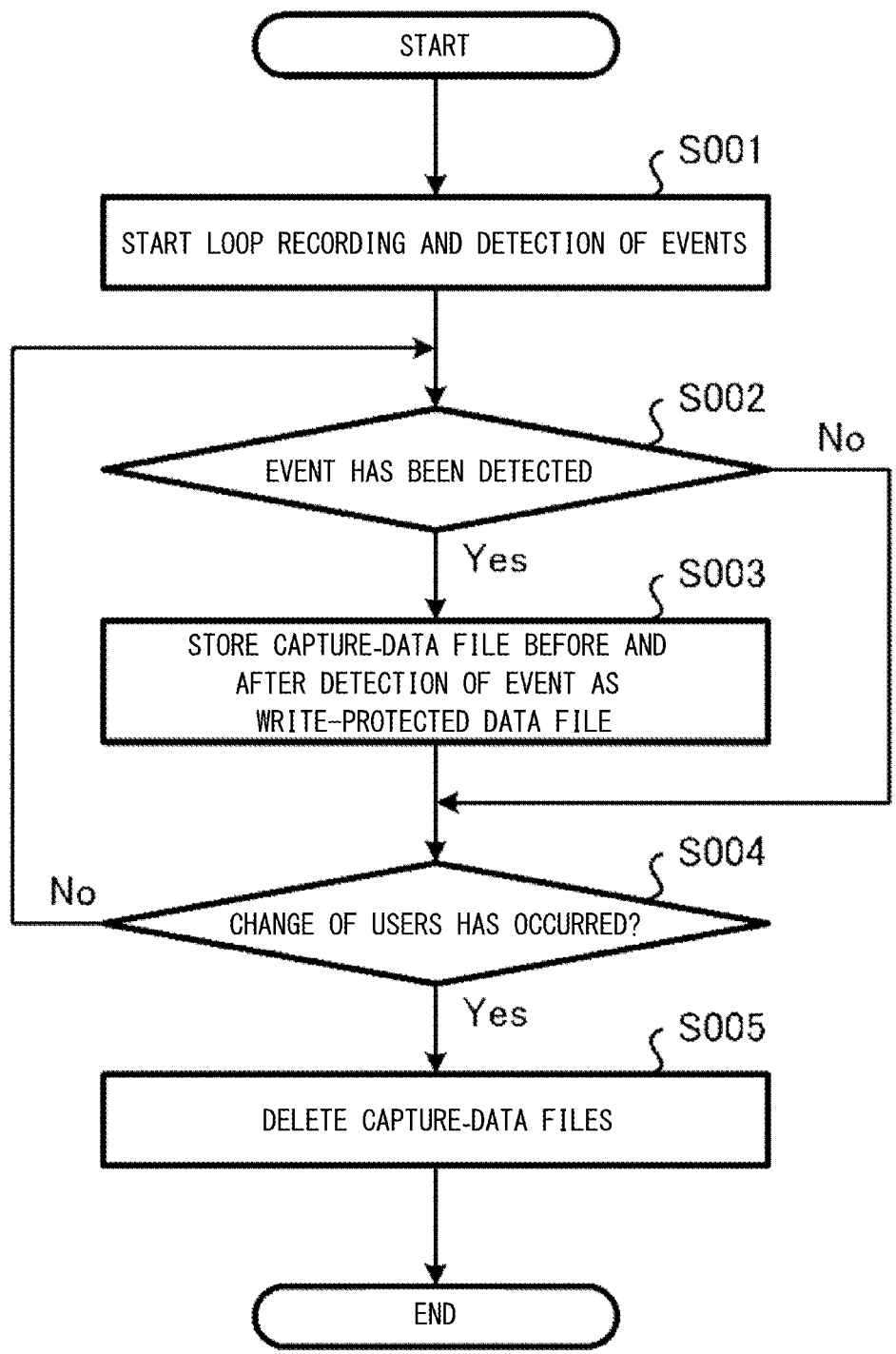
FIG. 3 is a flowchart showing a processing example of the recording apparatus according to the first embodiment of the present invention.

In FIG. 3, "START" of the procedure represents, for example, bringing the recording apparatus 1 into an operable state, for example, by starting up an engine of or turning on power of the vehicle, i.e., the moving body. The procedure may be started in response to an instruction to start a recording-and-reproducing procedure via the operation unit 30.

Along with the start of the procedure, the recording apparatus 1 starts the recording of the capture data and the detection of events (Step S001). The start of the recording of the capture-data items includes starts of the acquisition of the capture-data items from the imaging unit 10 by the capture-data acquisition unit 101, the conversion of the capture-data items into the files by the capture-data processing unit 103, and the recording of the capture-data files into the recording unit 20 by the recording control unit 104. In the recording of the capture-data files in this case, the capture-data files are recorded in the overwritable state into the recording unit 20, which is called normal recording or loop recording. In addition, the start of the detection of the events includes a start of the acquisition of the information about the accelerations from the sensor 50 by the event detection unit 108, and a start of the detection of the events on the basis of the information about the acquired accelerations.

In addition, while each of the processes shown in FIG. 3 is being executed, the recording of the capture data, the detection of the events by the acquisition of the information about the accelerations, and the specification of the information about the current position by the position-information acquisition unit 109 are continued.

When the recording of the capture data and the detection of the events are started in Step S001, the event detection unit 108 determines whether or not an event for the vehicle has been detected (Step S002). The event detection unit 108 determines that the event for the vehicle has been detected if, for example, the sensor 50 has detected an acceleration as that in case of collision of an object against the vehicle. The acceleration as that in case of collision of an object against the vehicle is, for example, an acceleration with an absolute value that is equal to or more than a predetermined threshold, or a sharply-increased acceleration with an absolute value that is equal to or more than the predetermined threshold.

If it is determined in Step S002 that the event has been detected (Yes in Step S002), the recording control unit 104 stores a capture-data file including a time point when the event detected in Step S002 occurs as the event-record data file (Step S003). The recording control unit 104 stores the capture-data file including the event-occurrence time point into the write-protected area in the recording unit 20 as shown, for example, in FIG. 2.

If it is determined in Step S002 that the event has not been detected (No in Step S002), the procedure proceeds to Step S004.

If the event-record data file is stored in Step S003, or if the event has not been detected in Step S002, the user-change determination unit 110 determines whether or not the change of the users of the vehicle has occurred (Step S004). Specifically, on the basis of the information item about the current position, which is acquired from the position-information acquisition unit 109, and of the position-information item of the pre-recorded specific place, the user-change determination unit 110 determines whether or not both the position-information items have matched with each other or fallen within a predetermined range, that is, whether or not the vehicle has been returned to or reached the specific place. The phrase "within a predetermined range" represents a case where a difference between the position-information item of the pre-recorded specific place and the current position is, for example, approximately less than 10 m.

In determining in Step S004 that the change of the users of the vehicle has occurred, the user-change determination unit 110 may also use a condition that the vehicle has stopped in addition to the determination as to whether the information item about the current position, which is acquired from the position-information acquisition unit 109, and the position-information item of the pre-recorded specific place have matched with each other or fallen within the predetermined range. The determination that the vehicle has stopped may be made on the basis of a fact that the information item about the current position, which is acquired from the position-information acquisition unit 109, has not changed, or by acquiring, for example, a gear-selection information item or a parking-brake operation information item from the vehicle via an interface (not shown).

The position-information item of the specific place, on the basis of which the determination that the change of the users of the vehicle has occurred is made in Step S004, represents, for example, a position where the vehicle is assigned for car sharing, that is, assigned to be shared by an unspecified number of people. In other words, the position-information item represents a place where the vehicle is rented out or returned.

The position-information item of the specific place, on the basis of which the determination that the change of the users of the vehicle has occurred is made in Step S004, need not necessarily represent a single place. For example, if there are a plurality of offices or the like where the car-sharing vehicle is rented out or returned, and if the vehicle is rented out at a place other than a place where the vehicle is returned, a plurality of these places are recorded as the specific places.

In addition, the place where the car-sharing vehicle is rented out or returned may be arbitrarily set by the user of the vehicle. For example, the user who is using the vehicle schedules where and when to return the vehicle, specifically, schedules the vehicle to be returned to a parking lot of an arbitrary shop, and another user reserves rental of the vehicle at the scheduled time and the scheduled location.

If the user-change determination unit 110 determines in Step S004 that the change of the users of the vehicle has not occurred, specifically, if the information item about the current position and the position-information item of the pre-recorded specific place have not matched with each other or fallen within the predetermined range (No in Step S004), the procedure returns to Step S002. If the user-change determination unit 110 determines in Step S004 that the change of the users of the vehicle has occurred, specifically, if the information item about the current position and the position-information item of the pre-recorded specific place have matched with each other or fallen within the predetermined range (Yes in Step S004), the recording control unit 104 deletes the capture-data files recorded in the recording unit 20, and the procedure is ended (Step S005).

The determination in Step S004 as to whether or not the change of the users has occurred is made on the basis of whether or not the vehicle has been returned to or reached the specific place. Thus, also when a subsequent user is absent, it is determined that the change of the users has occurred. In other words, a determination as to whether or not the use by the user has ended is made. Specifically, if it is determined in Step S004 that the use by the user has ended (Yes in Step S004), the procedure proceeds to Step S005, and if it is not determined that the use by the user has ended (No in Step S004), the procedure returns to Step S002.

As the process of Step S005, a process of ending the recording of the capture data and the detection of events, which are started in Step S001, also may be executed before the deletion of the capture-data files. In Step S005, when the capture-data files are deleted after the recording of the capture data and the detection of events have been ended, it is preferred that the deletion be not performed until the vehicle stops.

As the process of Step S005, the capture-data files may be deleted only when no events are detected in a period before occurrence of a change of users. This is because there are no problems even when the capture-data files are deleted at the time of returning the vehicle if no events are detected in the period before the occurrence of the change of the users. The period before the occurrence of the change of the users is a period from the deletion of the capture-data files after another user has used and returned the vehicle to a time when the determination of Yes in Step S004 is made during use of the vehicle by a subsequent user. In addition, the period before the occurrence of the change of the users may also be a period from the start of the procedure shown in FIG. 3, that is, from the start of the use of the vehicle to the time when the determination of Yes in Step S004 is made.

The capture-data files to be deleted in Step S005 are the capture-data files that are recorded in the overwritable state in the recording unit 20. If an event is detected in the period before the occurrence of the change of the users, when the event-record data file has been stored in the recording unit 20, none of the capture-data files recorded in the overwritable state and the event-record data file may be deleted, or the capture-data files recorded in the overwritable state except the event-record data file may be deleted. This is because at least an administrator of the vehicle needs to check the event-record data file if an event is detected in the period before the occurrence of the change of the users. The event-record data file stored in the recording unit 20 may be reproduced or deleted only by the administrator of the vehicle with use of a password or by existing authentication technologies.

Such a procedure enables the recording apparatus 1 to enhance security of video data that is captured from the vehicle or the like. Specifically, even when the change of the users of the vehicle has occurred, video data that is captured during use of the vehicle by another user can be prevented from being, for example, reproduced or copied by a still another user or others.

A second embodiment of the present invention is described hereinafter with reference to FIG. 4 and FIG. 5. Among details of a configuration of and a procedure by a recording apparatus according to the second embodiment, ones common to details of the configuration of and the procedure by the recording apparatus according to the first embodiment are not described.

Figure 4:
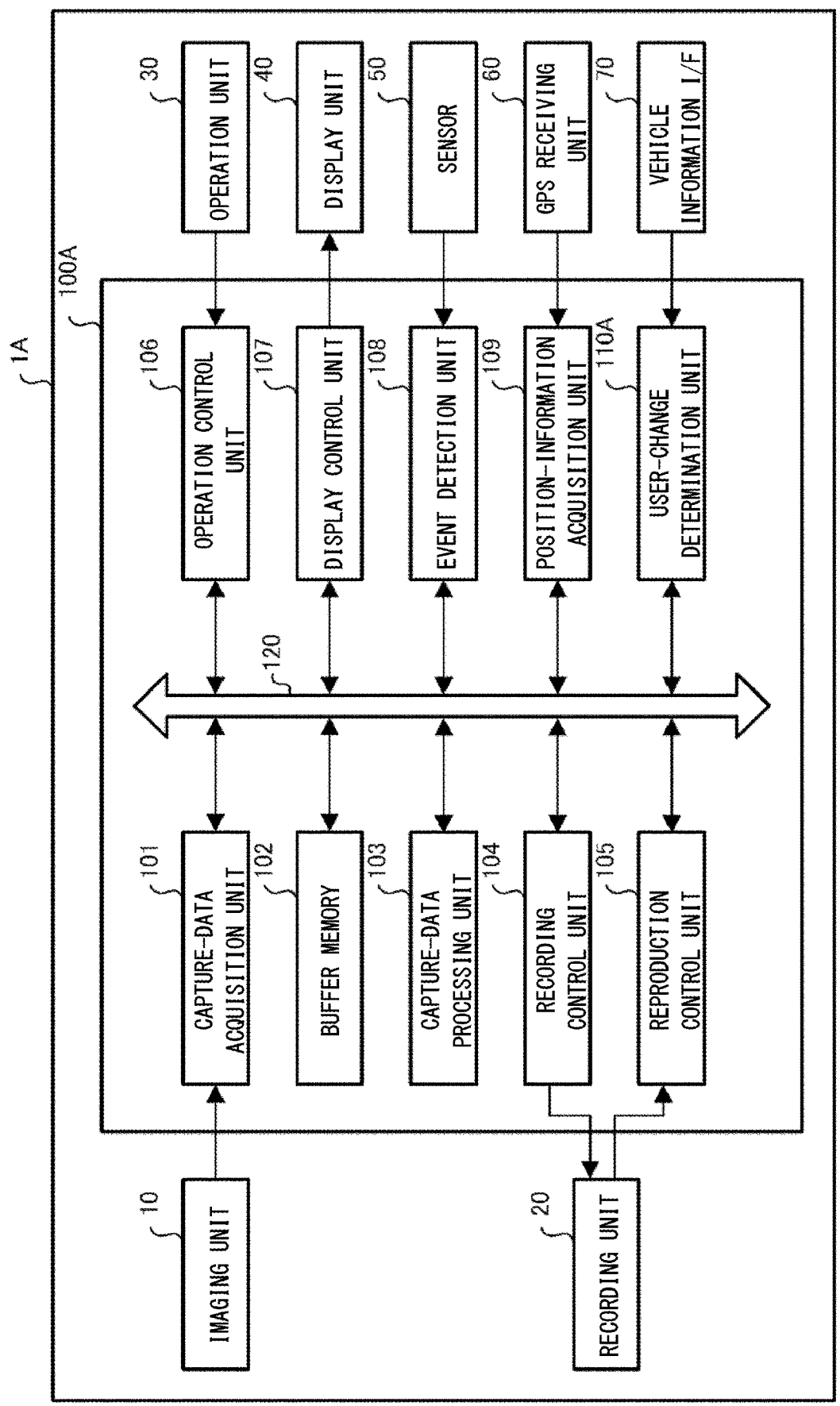
FIG. 4 is a block diagram showing a configuration of a recording apparatus according to a second embodiment of the present invention.

FIG. 4 is a block diagram showing a configuration of a recording apparatus 1A according to the second embodiment of the present invention. The recording apparatus 1A is different from the recording apparatus 1 according to the first embodiment in further including a vehicle information I/F 70. In addition, a control unit 100A according to the second embodiment of the present invention is different from the control unit 100 according to the first embodiment in including a user-change determination unit 110A instead of the user-change determination unit 110.

The vehicle information I/F 70 is an interface for allowing the recording apparatus 1A to acquire information from the vehicle and to transmit the information to the user-change determination unit 110A.

The vehicle information I/F 70 is also an interface for acquiring information about a smart key for unlocking and using the vehicle from the vehicle, such as a CAN (Controller Area Network) interface. For example, when the vehicle can be unlocked and used in response to operations to a smartphone that is usable as a pre-registered smart key, the vehicle information I/F 70 is an interface that is able to acquire information about a user of the smartphone, his/her ID, and the like.

The user-change determination unit 110A determines whether or not the change of the users of the vehicle has occurred. A determination by the user-change determination unit 110A that the change of the users of the vehicle has occurred is made in response to unlocking or a start of use of the vehicle with use of smart keys of other users or other IDs based on the information about the smart keys, the information being acquired via the vehicle information I/F 70.

The recording procedure to be executed by the recording apparatus 1A is described hereinafter with reference to FIG. 5. The recording procedure to be executed by the recording apparatus 1A is executed in accordance with the program by the control unit 100A as a computer that operates as the recording apparatus 1A.

Figure 5:
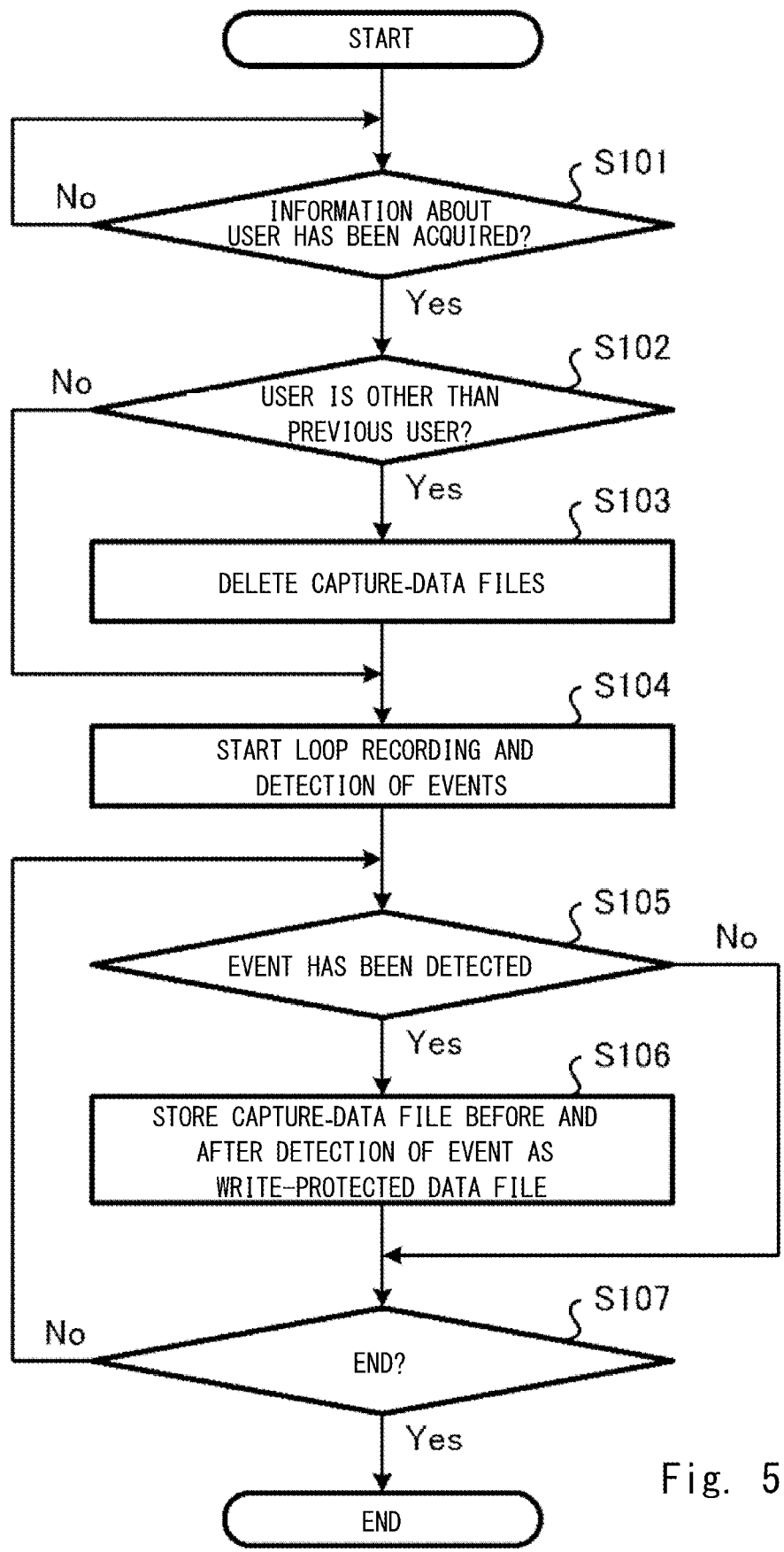
FIG. 5 is a flowchart showing a processing example of the recording apparatus according to the second embodiment of the present invention.

"START" of the procedure shown in FIG. 5 is a state in which the start of the use of the vehicle is waited for with the vehicle being at least not used while a specific trigger for starting the procedure has not been specified. In this state, when the use-start operation or the unlocking operation is performed with respect to the vehicle via the smart key or the like, the user-change determination unit 110A acquires the information about the user of the smart key or the like, his/her ID, and the like via the vehicle information I/F 70. Alternatively, the procedure shown in FIG. 5 is started in response to the start of the use of the vehicle. When the user of the vehicle is started, the user-change determination unit 110A acquires the information about the user of the smart key or the like, his/her ID, and the like via the vehicle information I/F 70.

First, the user-change determination unit 110A determines whether or not the information about the user of the smart key or the like, his/her ID, and the like have been acquired (Step S101). If the user-change determination unit 110A determines in Step S101 that the information about the user of the smart key or the like, his/her ID, and the like have not been acquired (No in Step S101), the user-change determination unit 110A executes the process of Step S101 again. If the user-change determination unit 110A determines in Step S101 that the information about the user of the smart key or the like, his/her ID, and the like have been acquired (Yes in Step S101), the user-change determination unit 110A determines whether or not the acquired information about the user of the smart key or the like, his/her ID, and the like have matched with previously-acquired information about the user of the smart key or the like, his/her ID, and the like. In other words, the user-change determination unit 110A determines whether or not the current user is other than a previous user on the basis of the information about the user of the smart key or the like, his/her ID, and the like (Step S102). In determining in Step S101 whether or not the information about the user and the like have been acquired, the condition that the vehicle has stopped may also be used.

If the user-change determination unit 110A determines in Step S102 that the current user is not other than the previous user, that is, the current user is identical to the previous user (No in Step S102), the recording apparatus 1A starts the recording of the capture data and the detection of events (S104). In other words, if the current user is identical to the previous user, the recording of the capture data and the detection of events are started without deleting the capture-data files recorded in the recording unit 20. If the user-change determination unit 110A determines in Step S102 that the current user is other than the previous user (Yes in Step S102), the recording control unit 104 deletes the capture-data files recorded in the recording unit 20 (Step S103), and then the recording of the capture data and the detection of events are started (S104).

Step S105 and Step S106 in FIG. 5 are respectively the same as Step S002 and Step S003 in FIG. 3, and hence are not described.

If No in Step S105, or after Step S106, the recording apparatus 1A determines whether or not to end the recording of the capture data and the detection of events, which are started in S104 (Step S107). The determination in Step S107 is made if the user-change determination unit 110A has acquired the end of the use of the vehicle or locking of the vehicle. In making the determination in Step S107, the condition that the information item about the current position, which is acquired from the position-information acquisition unit 109, and the position-information item of the pre-recorded specific place have matched with each other or fallen within the predetermined range may also be used.

In Step S107, if the recording apparatus 1A determines not to end the recording of the capture data and the detection of events (No in Step S107), the procedure returns to Step S105. In Step S107, if the recording apparatus 1A determines to end the recording of the capture data and the detection of events (Yes in Step S107), the procedure is ended.

With regard to the determination in Step S102 as to whether or not the current user is identical to the previous user, even when the user-change determination unit 110A has acquired different information about the user of the smart key or the like, his/her ID, and the like, if a plurality of smart keys or the like have been registered by the identical user and the smart keys or the like are replaced by an identical contractor, the determination that the previous user and the current user are identical to each other may be made.

Such a procedure enables the recording apparatus 1A to enhance security of video data that is captured from the vehicle or the like. Specifically, even when the change of the users of the vehicle has occurred, video data that is captured during use of the vehicle by another user can be prevented from being, for example, reproduced or copied by a still another user or others.

A third embodiment of the present invention is described hereinafter with reference to FIG. 6 and FIG. 7. Among details of a configuration of and a procedure by a recording apparatus according to the third embodiment, ones common to details of the configuration of and the procedure by the recording apparatus according to the first embodiment are not described.

Figure 6:
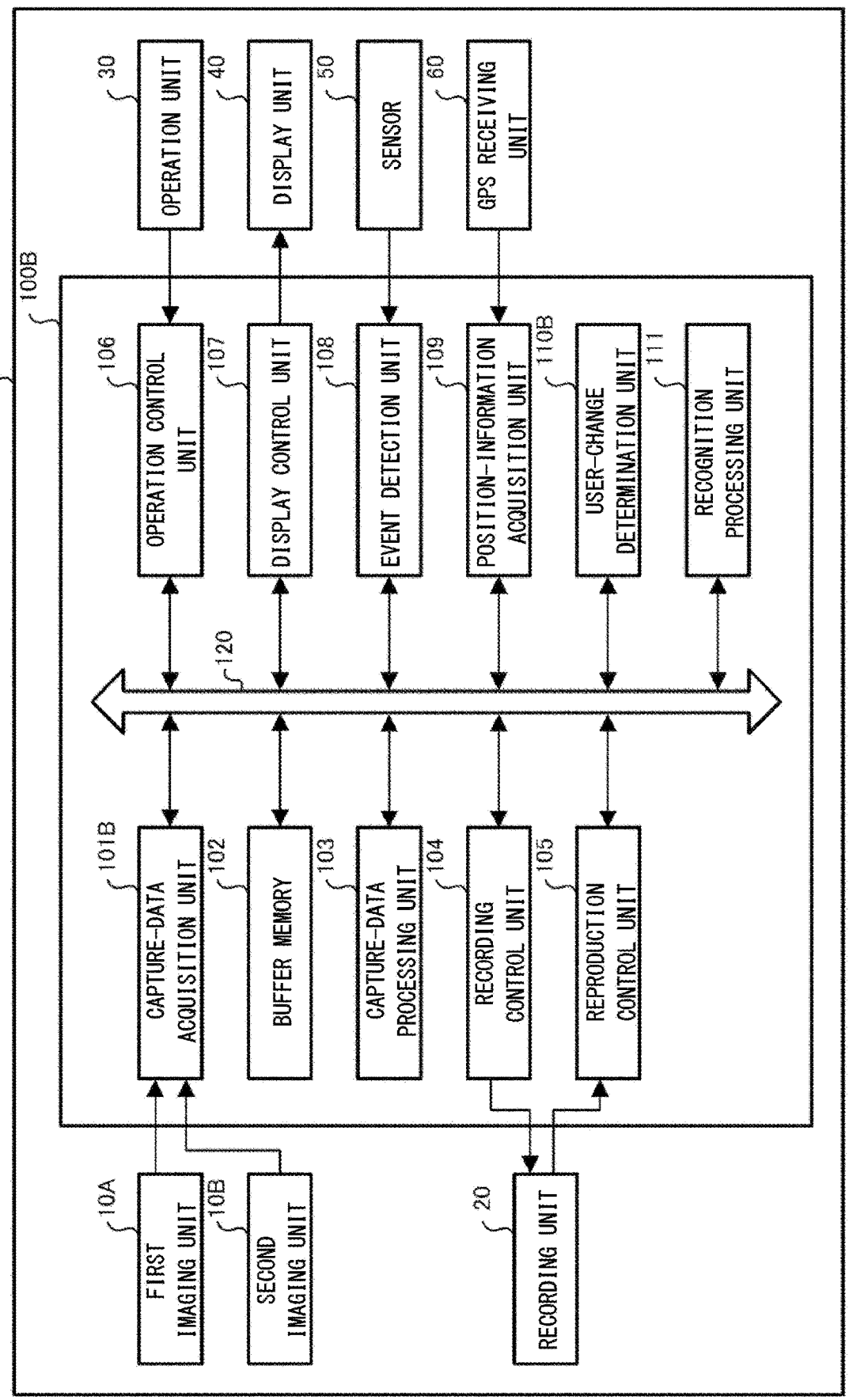
FIG. 6 is a block diagram showing a configuration of a recording apparatus according to a third embodiment of the present invention.
Figure 7:
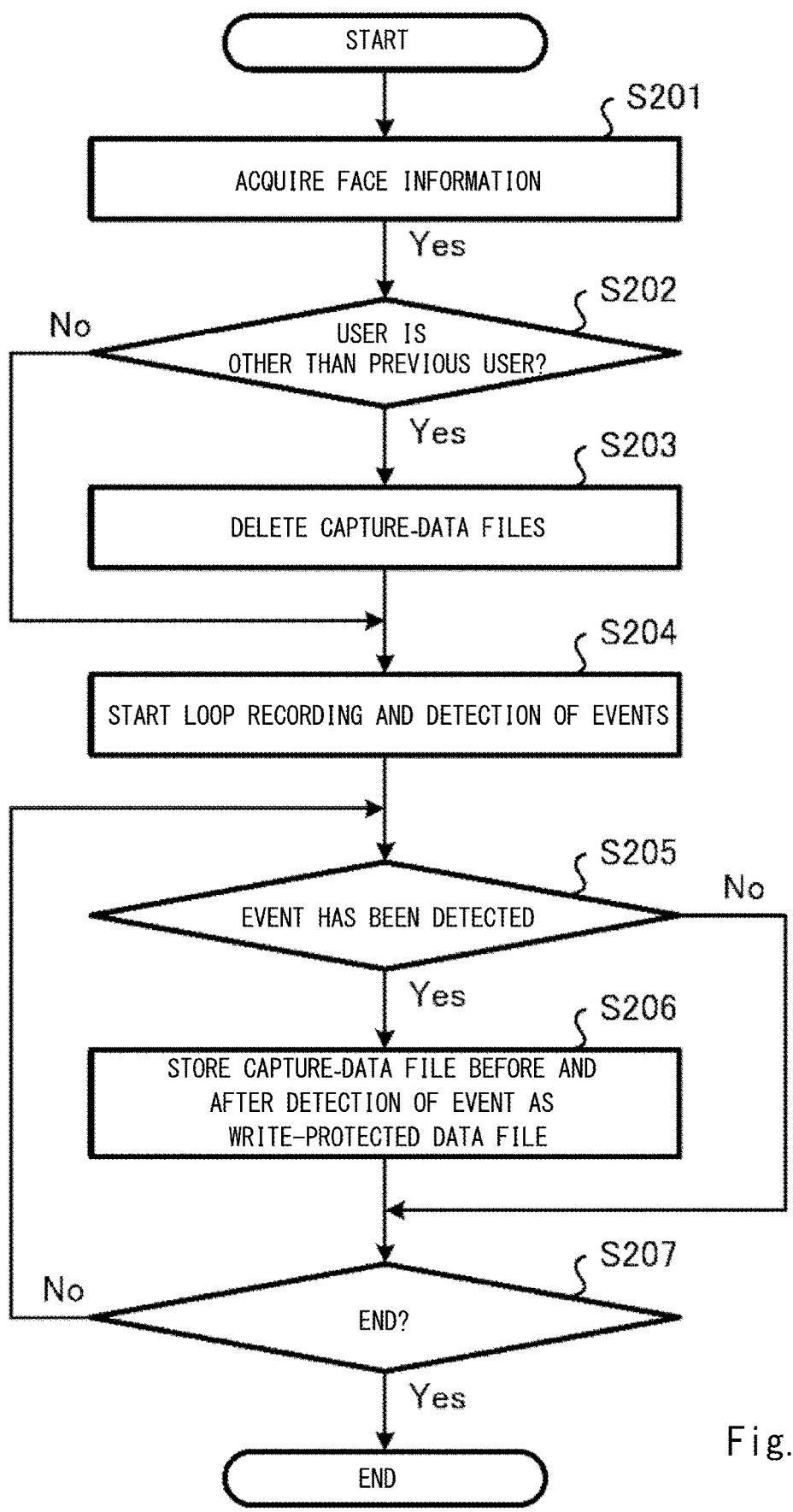
FIG. 7 is a flowchart showing a processing example of the recording apparatus according to the third embodiment of the present invention.

FIG. 6 is a block diagram showing a configuration of a recording apparatus 1B according to the third embodiment of the present invention. The recording apparatus 1B is different from the recording apparatus 1 according to the first embodiment in including a first imaging unit 10A and a second imaging unit 10B instead of the imaging unit 10. Further, a control unit 100B according to the third embodiment of the present invention is different from the control unit 100 according to the first embodiment in including a capture-data acquisition unit 101B instead of the capture-data acquisition unit 101, and including a user-change determination unit 110B instead of the user-change determination unit 110. Still further, the control unit 100B includes a recognition processing unit 111.

Similar to the imaging unit 10 according to the first embodiment, the first imaging unit 10A includes cameras of various types, which capture the surroundings of the vehicle, i.e., the moving body.

The second imaging unit 10B is a camera that captures the face of a driver of the vehicle, which is arranged in the cabin in an orientation to the face of the driver. The second imaging unit 10B may be a camera that captures visible light, or may be a camera that captures infrared light. When the second imaging unit 10B is the camera that captures infrared light, the second imaging unit 10B may include an infrared radiation unit that radiates infrared rays toward the face of the driver.

The capture-data acquisition unit 101B acquires capture-data items obtained by the first imaging unit 10A and the second imaging unit 10B. The capture-data acquisition unit 101B acquires the capture-data items from the first imaging unit 10A as first capture-data items, and acquires the capture-data items from the second imaging unit 10B as second capture-data items.

The recognition processing unit 111 recognizes human faces from the second capture-data items acquired by the capture-data acquisition unit 101B. The recognition processing unit 111 detects the human faces from the second capture-data items, specifically, detects feature parts such as eyes, noses, mouths, and the like within ranges of the detected human faces. The recognition processing unit 111 outputs proportions of sizes of the detected feature parts such as the eyes, the noses, the mouths, and the like, or parameters of positional relationships between these parts as face recognition results to the user-change determination unit 110B.

The user-change determination unit 110B determines whether or not the change of the users of the vehicle has occurred. A determination by the user-change determination unit 110B that the change of the users of the vehicle has occurred is made on the basis of the face recognition results from the recognition processing unit 111 that has recognized the face of the driver of the vehicle. The user-change determination unit 110B acquires results of the face recognition of the face of a person who is seated at a driver's seat of the vehicle from the recognition processing unit 111 at arbitrary timings, specifically, each time the vehicle is stopped or each time the power of the vehicle is turned off. If the person is identical on the basis of the face recognition results acquired from the recognition processing unit 111, the user-change determination unit 110B determines that the change of the users of the vehicle has not occurred. If the person is not identical on the basis of the face recognition results, the user-change determination unit 110B determines that the change of the users of the vehicle has occurred.

Related-art arbitrary techniques are applicable to the face recognition process by the recognition processing unit 111, and the person identification process by the user-change determination unit 110B.

The recording procedure to be executed by the recording apparatus 1B is described hereinafter with reference to FIG. 7. The recording procedure to be executed by the recording apparatus 1B is executed in accordance with the program by the control unit 100B as a computer that operates as the recording apparatus 1B. Processes of Step S203 to Step S207 in FIG. 7 are respectively the same as the processes of Step S103 to Step S107 in FIG. 5, and hence are not described.

First, the user-change determination unit 110B acquires face information from the recognition processing unit 111 (Step S201). The recognition processing unit 111 recognizes the face of the person seated at the driver's seat of the vehicle. Thus, if the face information cannot be acquired in the process of Step S201, there is no person seated at the driver's seat. In such a case, this procedure may be ended, or may be continued until the face information is acquired. In addition, the user-change determination unit 110B stores the acquired face information, for example, into the internal memory (not shown) or the recording unit 20.

After the acquisition of the face information in Step S201, the user-change determination unit 110B compares previously-stored face information and the face information acquired in Step S201 to each other, and determines whether or not the user is other than a previous user, that is, the driver is other than a previous driver (Step S202). The determination in Step S202 as to whether or not the person is identical is made on the basis of similarities between the proportions of the sizes of the detected feature parts of the faces, or between the parameters of the positional relationships between these parts, the proportions and the parameters being acquired from the recognition processing unit 111.

If the user-change determination unit 110B determines in Step S202 that the current user is not other than the previous user, that is, the current user is identical to the previous user (No in Step S202), the procedure proceeds to Step S203. If the user-change determination unit 110B determines in Step S202 that the current user is other than the previous user (Yes in Step S202), the procedure proceeds to Step S204.

Such a procedure enables the recording apparatus 1B to enhance security of video data that is captured from the vehicle or the like. Specifically, even when the change of the users of the vehicle has occurred, video data that is captured during use of the vehicle by another user can be prevented from being, for example, reproduced or copied by a still another user or others.

Note that the present invention is not limited to the foregoing embodiments, and modifications may be made as appropriate within the gist of the present invention. All the foregoing embodiments encompass substantially the same configuration, and may be combined as appropriate with each other. In addition, the program for causing the computer to execute the above-described procedures may be stored in non-transitory computer-readable media of various types, and may be supplied to the computers that operate as the recording apparatuses.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

What is claimed is:

1. A recording control apparatus comprising:
   a capture-data acquisition unit configured to acquire capture-data items obtained by a camera configured to capture surroundings of a vehicle;
   an event detection unit configured to detect an event for the vehicle;
   a user-change determination unit configured to determine whether or not a change of users of the vehicle has occurred; and
   a recording control unit configured to record the capture-data items acquired by the capture-data acquisition unit into a recording unit, configured to store one of the capture-data items as an event-record data item into the recording unit when the event detection unit has detected the event, the one of the capture-data items corresponding to the event, and configured to delete the capture-data items recorded in the recording unit when the user-change determination unit determines that the change of the users of the vehicle has occurred.

2. The recording control apparatus according to claim 1, wherein the user-change determination unit determines that the change of the users of the vehicle has occurred when the event have not been detected in a period before the change of the users of the vehicle, and then the recording control unit deletes the capture-data items recorded in the recording unit.

3. The recording control apparatus according to claim 1, wherein the user-change determination unit determines that the change of the users of the vehicle has occurred when the event have been detected in a period before the change of the users of the vehicle, and then the recording control unit deletes the capture-data items except the event-record data item stored in the recording unit.

4. The recording control apparatus according to claim 1, wherein the user-change determination unit determines that the change of the users of the vehicle has occurred on the basis of position information of the vehicle.

5. The recording control apparatus according to claim 4, wherein the user-change determination unit determines that the change of the users of the vehicle has occurred when the vehicle has reached a specific place where the vehicle is rented out or returned.

6. The recording control apparatus according to claim 1, wherein the user-change determination unit determines that the change of the users of the vehicle has occurred on the basis of a smart key that starts up the vehicle.

7. The recording control apparatus according to claim 1, wherein the user-change determination unit determines that the change of the users of the vehicle has occurred on the basis of results of recognition of the face of a person who is seated at a driver's seat of the vehicle.

8. A recording control method comprising:
- a capture-data acquisition step of acquiring capture-data items obtained by a camera configured to capture surroundings of a vehicle;
- an event detection step of detecting an event for the vehicle;
- a user-change determination step of determining whether or not a change of users of the vehicle has occurred; and
- a recording control step including recording the capture-data items acquired in the capture-data acquisition step into a recording unit, storing one of the capture-data items as an event-record data item into the recording unit when the event is detected in the event detection step, the one of the capture-data items corresponding to the event, and deleting the capture-data items recorded in the recording unit when a determination that the change of the users of the vehicle has occurred is made in the user-change determination step.

9. A non-transitory computer readable medium storing a program for a computer configured to operate as a recording control apparatus to perform:
- a capture-data acquisition step of acquiring capture-data items obtained by a camera configured to capture surroundings of a vehicle;
- an event detection step of detecting an event for the vehicle;
- a user-change determination step of determining whether or not a change of users of the vehicle has occurred; and
- a recording control step including recording the capture-data items acquired in the capture-data acquisition step into a recording unit, storing one of the capture-data items as an event-record data item into the recording unit when the event is detected in the event detection step, the one of the capture-data items corresponding to the event, and deleting the capture-data items recorded in the recording unit when a determination that the change of the users of the vehicle has occurred is made in the user-change determination step.

* * * * *